Dec. 6, 1932.  A. A. MERRILL  1,889,864
AIRPLANE
Filed Sept. 6, 1929  6 Sheets-Sheet 1

INVENTOR
Albert A. Merrill.
BY Moakley + Gill
ATTORNEYS

Dec. 6, 1932.  A. A. MERRILL  1,889,864
AIRPLANE
Filed Sept. 6, 1929  6 Sheets-Sheet 2
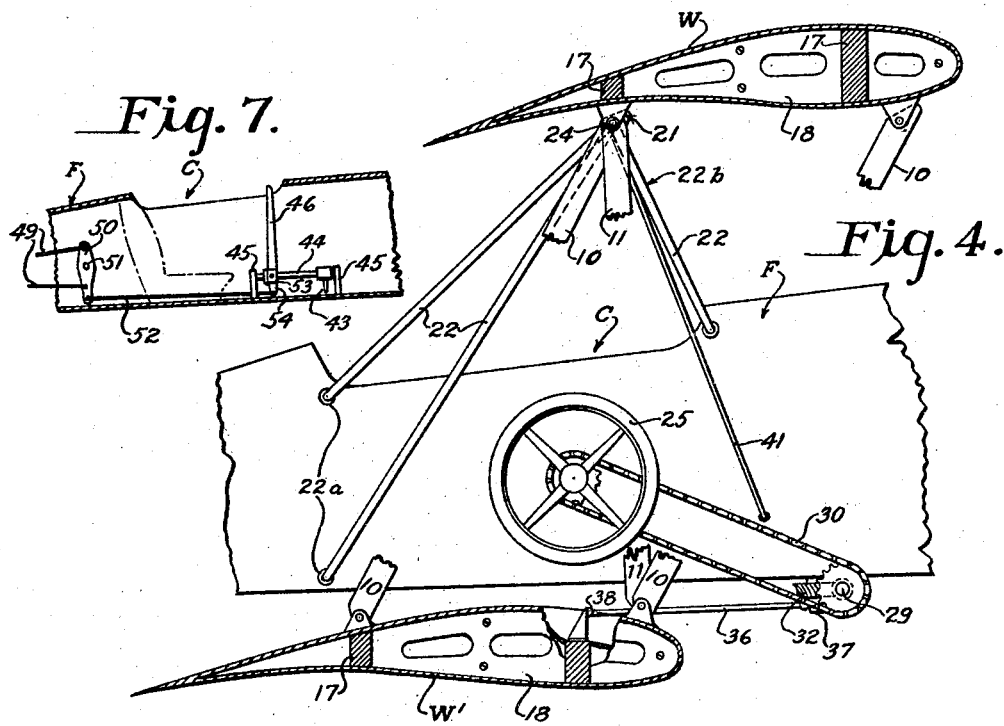
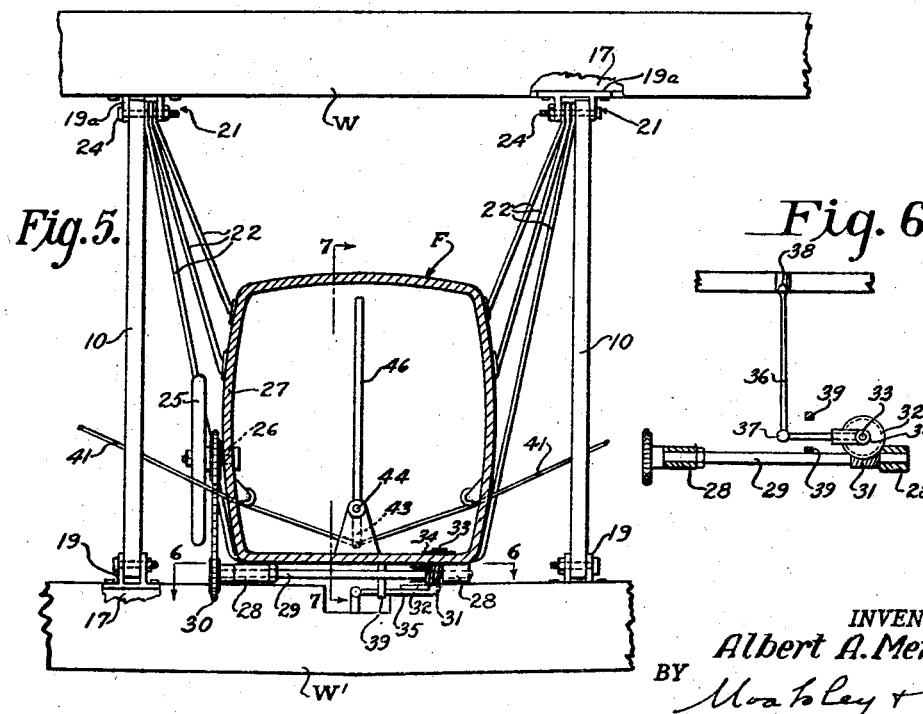
INVENTOR
Albert A. Merrill.
BY
ATTORNEYS Dec. 6, 1932.   A. A. MERRILL   1,889,864
AIRPLANE
Filed Sept. 6, 1929   6 Sheets-Sheet 3

INVENTOR
Albert A. Merrill
BY
ATTORNEYS

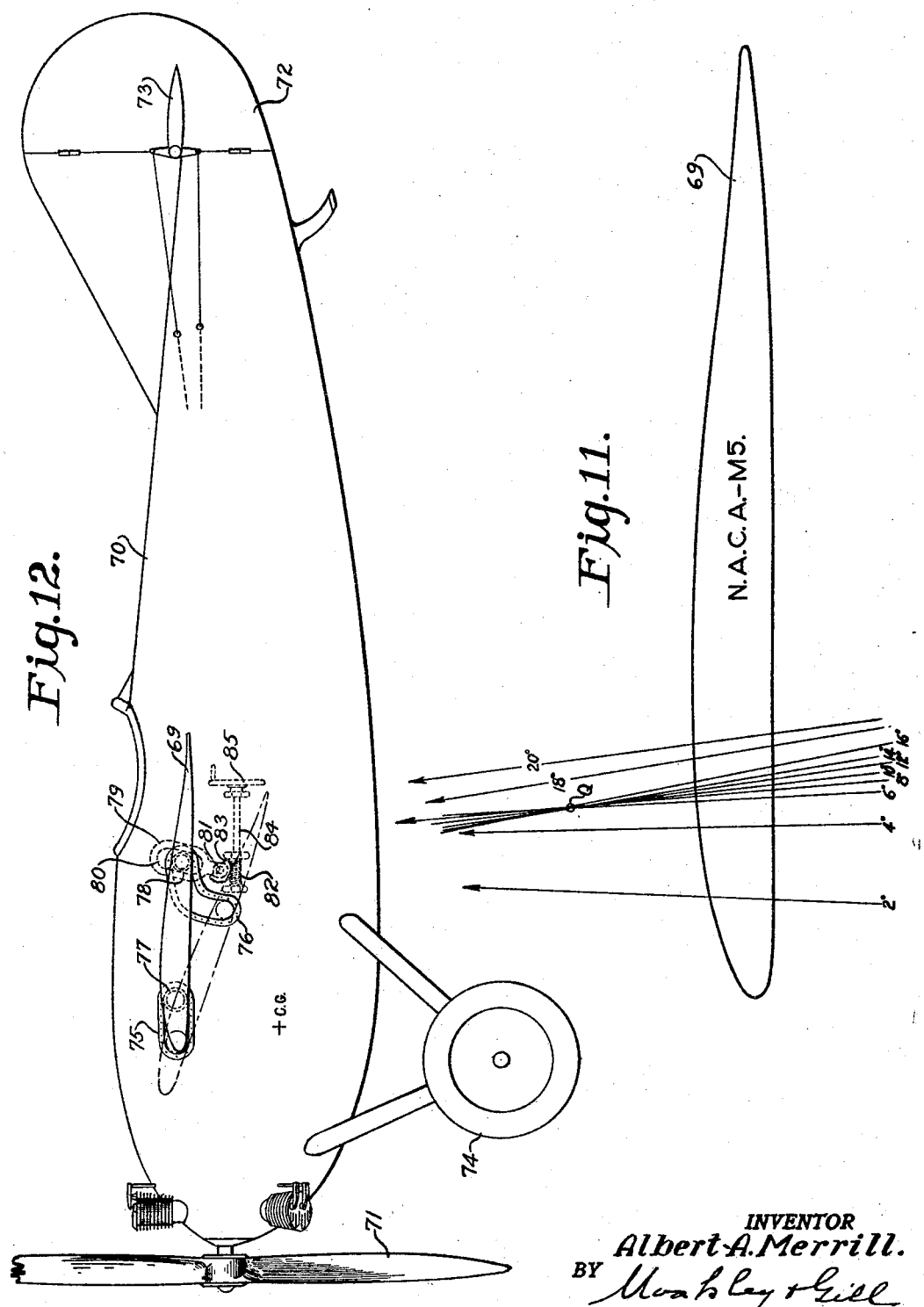

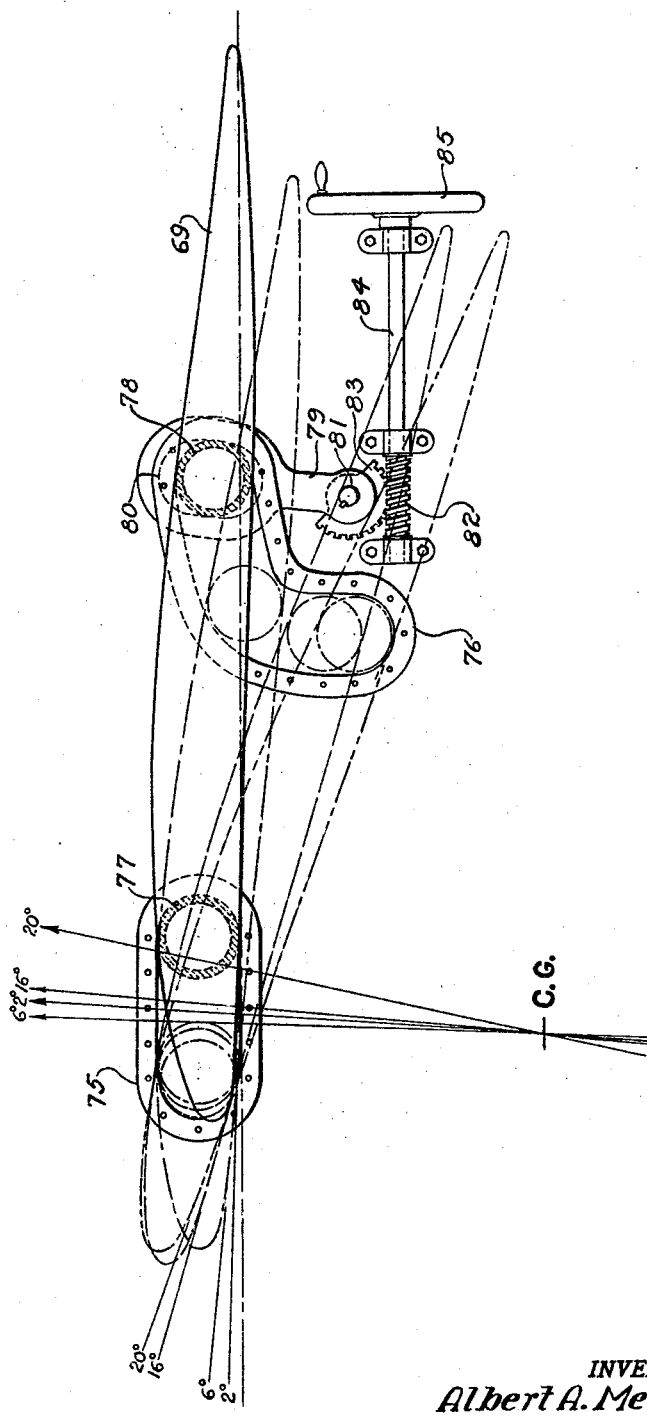

Patented Dec. 6, 1932

1,889,864

UNITED STATES PATENT OFFICE

ALBERT A. MERRILL, OF JAMAICA, NEW YORK, ASSIGNOR, BY MESNE ASSIGNMENTS, TO MERRILL AIRCRAFT COMPANY, OF LONG ISLAND CITY, NEW YORK, A CORPORATION OF DELAWARE

AIRPLANE

Application filed September 6, 1929. Serial No. 390,767.

This invention relates generally to airplanes and its general object is to provide an airplane which is of superior nature as regards safety and ease of handling in taking-off, flight and landing, this superiority arising mainly by reason of the provision of an inherently stable wing structure mounted on the fuselage in a manner to be mechanically shifted with relation thereto for varying the angle of attack.

More specifically the invention relates to airplanes having unitary wing structures, comprising one or more aerodynamic sustaining elements bearing constant geometric relations one to another, in which there is a zone wherein the lines of action of the resultant aerodynamic forces progress in consecutively increasing order, in displacement from the entering edge of the wing structure as the angle of attack increases, or in other words, these lines of action progress consecutively from front to rear as the angle of attack increases.

I am aware that others have used wings of the general class described above mounted in fixed relation to the fuselages of their airplanes and have provided their airplanes with elevators which they depress or raise, thus altering the angle of attack through the agency of an aerodynamic force, the magnitude of which depends on the air speed of the airplane, and on the angle through which the pilot displaces his elevators, as well as on the speed with which he displaces his elevators to a given angle. This requires a skillful action on the part of the pilot to change his angle of attack by a desired amount.

In a fixed wing ship the whole airplane must be rotated relative to the path to change the angle of attack of the wings. In the case of the fixed wing ship depending as it does upon the tail group for pitch control, the tail group may be at times ineffective owing to the type of flow of the air caused by the disturbances set up by the wings.

In the fixed wing tail stabilizer ship the tail group is more affected by changes in the velocity of the slip stream from the propeller, than are the wings or supporting means. Therefore, the influence of change of speed of the engine is much greater on the tail group than it is on the wings, which requires additional skill on the part of the pilot to handle his machine through varying engine speeds.

More specifically it is an object of this invention to provide an airplane having an aerodynamic supporting system of the class referred to in which the angle of attack of the surface can be altered at will without disturbing the longitudinal balance of the airplane so that it will remain in its correct flying attitude regardless of external influences tending to upset it and will not of itself depart from such normal attitude.

This object is attained by movably mounting an aerodynamic supporting system of the character described upon the fuselage in such a manner that it may be adjusted to change its angle of attack and simultaneously always assume a position such that the line of action of the resultant force acting on the surface at that angle of attack will pass, at least, approximately, through the center of gravity of the airplane. Under these conditions the airplane will be in stable equilibrium at all angular settings of the supporting surface so that whenever any external influence has displaced the longitudinal axis of the system thereby altering the angle of attack and bringing into operation a new line of action of resultant force corresponding thereto, the moment of the new force about the center of gravity will immediately tend to rotate the airplane back to its former angle of attack.

I am aware that others have proposed to mount wings of a different character in which the lines of action of the resultant forces progress from rear to front or move irregularly backward and forward with increase of angle of attack, for swinging and other movements on their fuselages. However, such constructions would not give the same result as mine does. Whenever the balance of such an airplane is disturbed and the angle of attack is displaced the line of action of the resultant force corresponding to the new angle of attack produces a couple, tending to increase still further the amount of displacement, constituting a condition of inherent instability. If it were possible to fly such a plane at all it could only be accomplished by an exceptionally skillful pilot through the continuous use of his controls to restore the balance.

By virtue of my invention the following special advantages are obtained:—The angle of attack is definitely varied at will by mechanical means, and not by aerodynamic forces which depend upon the movement and speed of the airplane through the air. If it were desired to gain increased stiffness in any adjusted position of the wing structure by adding a stabilizer in the tail of the fuselage, it would be feasible in this invention, whereas it would not be feasible in any other type without a loss of stability in certain adjusted positions of the wing structure. I do not, therefore, exclude the presence of such a stabilizer although it is not required. The pilot is unable to accidentally store up undue angular momentum in the mass of the airplane by over-controlling, thereby putting his machine into a stall. The fuselage assumes an attitude essentially constant to the path regardless of any manipulations of the wings on the part of the pilot. This at all times keeps the parasite resistance a minimum and offers the most efficient use of the power plant of the airplane. By the provision of elevators at the rear, as an auxiliary for acrobatics, the wings may be left in any adjusted position, and the airplane flown after the manner of the conventional airplane of the present day if the pilot so desires, thereby affording the advantages of two independent methods of control.

The particular nature of the invention as well as other objects and advantages thereof will appear more clearly from a description of certain embodiments thereof as shown in the accompanying drawings, in which:—

Fig. 4 is an enlarged section about on line 4—4 of Fig. 2;

Fig. 5 is a view of Fig. 4 looking from the right thereof;

Fig. 6 is a detail section about on line 6—6 of Fig. 5;

Fig. 7 is a reduced, fragmentary section on line 7—7 of Fig. 5, the rudder control being omitted in order not to complicate the figure;

Figure 9:
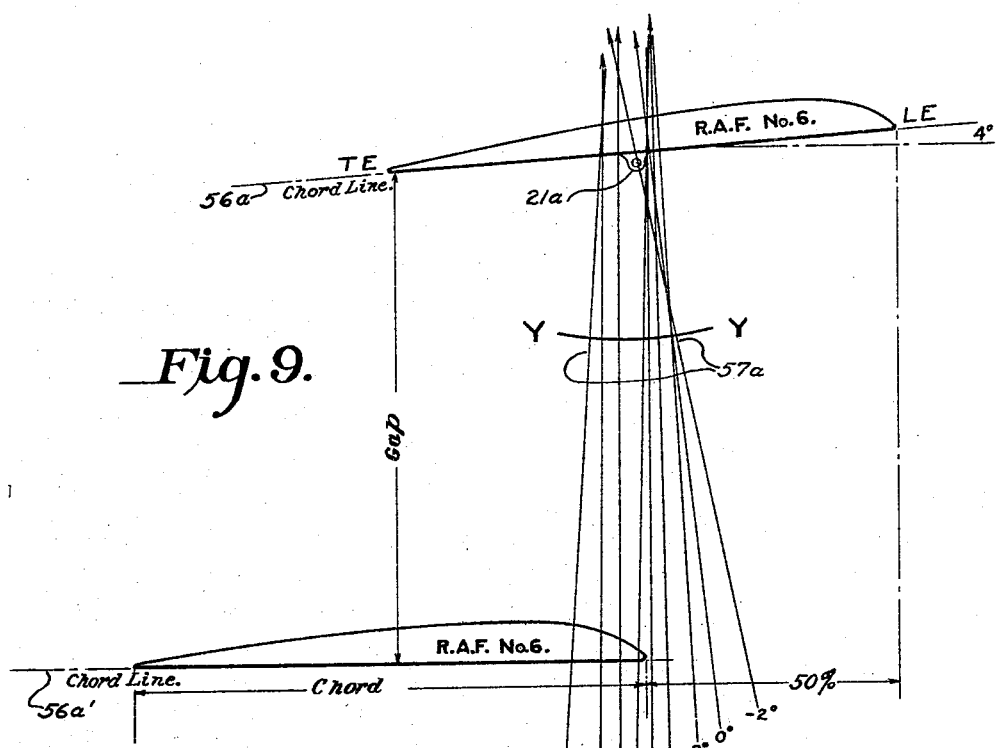

Fig. 9 is a profile of two R. A. F. No. 6 airfoils with 50% stagger, 4° decalage and 1.0 $\frac{gap}{chord}$ ratio showing an analysis of the resultant force progression.

Figure 10:
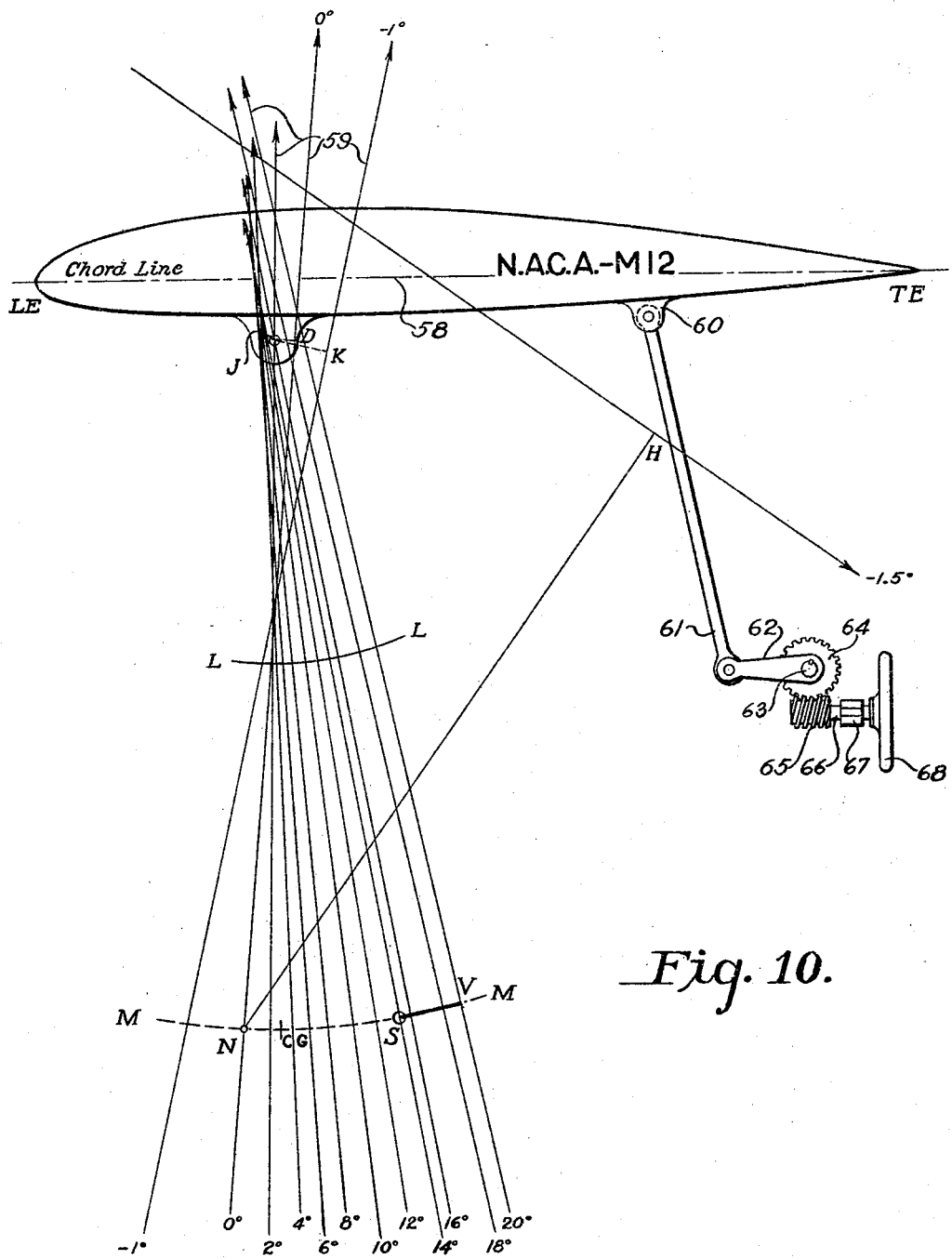

Fig. 10 shows a profile of the N. A. C. A.—M12 airfoil with an analysis of the resultant force progression, and a schematic suggestion of a means for utilizing this airfoil in an embodiment of this invention.

Fig. 11 shows a profile of the N. A. C. A.—M5 airfoil with an analysis of the resultant force progression.

Fig. 12 shows an airplane embodying the airfoil disclosed in Fig. 11, and

Fig. 13 is an enlarged view showing in more detail the application of the airfoil of Fig. 11 to an airplane.

In Figs. 1 to 7 inclusive, my invention is shown embodied in an airplane A having a fuselage F of any suitable design and consisting generally of cockpit or control compartment C, tail portion T, engine E, propeller P, and biplane cellule B, the latter being made up of supporting surfaces or wings W, W' spaced vertically by struts 10 and braced by diagonals 11. Usual wire bracing is employed, but it is not shown here since it would confuse the drawings. Fuselage F carries the usual landing gear 12, tail-skid 13, and rudder 14, the latter being controllable from cockpit C, through usual wires 15 running to the centrally pivoted tiller or rudder-bar 16.

The exact structure of the elements making up the biplane cellule C is not important to this invention, considered in its broader aspects, since it may be of any suitable nature. For instance, I have here shown the wings as including usual spars 17 and ribs 18, the two wings being connected and vertically spaced by struts 10 imbedded in the wings or connected to the ribs or spars in any suitable manner, as, for instance, by U members 19 secured to spars 17 (Fig. 5). However, the wing arrangement is such that the cellule is rigid and the lines of action of the resultant aerodynamic forces progress from front to rear in the region of the center of gravity of the airplane as the angle of attack is increased, it here being shown as having the correct relations of stagger, decalage, and $\frac{gap}{chord}$ ratio. For instance, referring particularly to Fig. 3, the leading edge 20 of the rearward and lower wing W' is located about centrally under the forward and upper wing W, giving about fifty percent "stagger". The constant decalage is about four degrees, that is, the angle of incidence of the leading supporting surface is about four degrees greater than that of the lower surface and the chord length is substantially equal to the gap between the wings. That such an airplane is inherently stable is a thoroughly proven fact, these drawings Figs. 1 to 7 representing the essential proportions and details of an airplane which I have successfully built and flown.

The center of gravity of the ship is so located with reference to the wings that there is provided static pitch stability. For this purpose under all operating conditions the center of gravity should lie below the point of intersection of vectors representing the location, direction and amount of the resultant pressures acting on the cellule as it passes through the air and is moved through its flying range, and these vectors should progress consecutively from front to rear as the angle of attack is increased. This location depends upon the individual characteristics of given wing and fuselage combinations and may be determined by model tests, for instance. In a ship having approximately the characteristics here shown, this location is found to be substantially over the leading edge of the lower surface, or below and substantially in vertical alinement with the point about which the cellule moves bodily with respect to the fuselage.

While I do not wish to be limited to the specific degrees of stagger and decalage, I have found through experience gained in research, particularly in test flights totalling about two hundred flying hours, in airplanes made in accordance with this invention, that the combination set forth gives proper stability without undue "stiffness".

While it lies within the scope of my invention, considered in its broader aspects, to mount the cellule on the fuselage in any manner allowing proper relative translation and to provide any suitable means for bringing about such translation, I have here shown a mounting and actuating means which has been found effective in test flights.

Referring particularly to Figs. 4 and 5, I have shown a pair of pivotal connections, individually indicated at 21, between the cellule and opposite sides of the fuselage, said fuselage being located between the two supporting surfaces. There are two sets of upwardly and inwardly extending tension or connection rods 22 provided, one set at each side of the fuselage, the rods in each set converging from their points of fuselage-connection 22a to meet at point 21 where they are pivotally connected by pintle 24 to the upper wing or one of the struts 10 through U members 19a, or to any other properly located rigid portion of the wing or cellule structure. The rigid cellule is thus mounted for bodily translation or rotation about the transverse and normally horizontal axis R (Fig. 2), the cabane or tripodal frame 22b, made up of rods 22, providing the connecting structure between fuselage and cellule.

As a convenient means for rotatably and adjustably moving the cellule about connection 21 to vary the trim angle, I provide a hand wheel 25 whose shaft 26 has bearing in side wall 27 of the fuselage, the wheel preferably, though not necessarily, being adapted to be rotated through a vertical plane adjacent the outer face of said wall.

Journaled at 28 to the underside of the fuselage is a drive shaft 29 which is adapted to be rotated by wheel 25 through sprocket and chain connection 30. Shaft 29 carries a worm 31 which meshes with a worm gear 32 on the vertically disposed shaft 33, the latter being journaled at 34 to the bottom of the fuselage. Shaft 33 carries a crank arm 35, preferably with its free end located centrally of the fuselage, said crank being connected through drag link 36 to wing W'. The draglink connections 37 and 38, to crank and wing, respectively, are of a type allowing for the arcuate movement of the cellule with respect to the fuselage; for instance, they may be universal joints, as conventionally illustrated.

It will be apparent that angular movement of crank 35, imparted to it through rotation of wheel 25, acts through link 36 to impart angular or pivotal movement to cellule B about axis R. While any suitable means may be employed for the purpose, preferably worm 31 and gear 32 have "self-locking" or "irreversible" characteristics in order that the drive connection between wheel and wings may be held in adjusted position. In other words, the wings are thereby releasably held at the trim angle to which they are adjusted, the advantage of this feature being self-evident.

The extent of angular movement of the cellule is preferably limited to a degree insuring that the trim angle can never be such that the air speed be reduced below the critical speed for yaw and roll control. A movement of about thirty degrees suffices for most purposes, and the limitation may be secured by so arranging the lower wing with respect to the fuselage that said wing contacts with the bottom of the fuselage at each end of its swing through an arc of predetermined extent, or the limitation may be secured by properly limiting the extent of movement of any element of the cellule-swinging mechanism. For instance, stops 39 may depend from the fuselage into the path of crank 35 and limit the extent of angular movement of the crank, and hence of the cellule, to a proper degree.

The above described mounting of the inherently stable cellule B allows its movement in a manner to alter the trim angle, or, as usually expressed, to alter the angle between the chord of the lower plane and the longitudinal axis of the fuselage, as will be readily understood, and all the advantageous characteristics of control and stability set out at the fore part of the specification, are had.

It will readily be seen that in making a

"three point" landing the cellulose may be swung in a manner to increase the angle of incidence greatly beyond that possible to usual airplanes, and a most effective "air brake" thus is provided, with attendant advantages as to landing speed and run. This "landing angle" may be as great as thirty degrees or more.

It is desirable that wing W' be provided with usual ailerons 40, the aileron control wires 41 passing therefrom through pulleys 42, which are located on axis R (or, otherwise expressed, in axial alinement with pintles 24), to crank arm 43 on rock shaft 44. This shaft is journaled above the floor of the fuselage in boxes 45 and is adapted to be rocked by means of the "stick" 46 which is applied thereto in any suitable manner. Due to the disposition of pulleys 42, that is, at the axis of cellule-movement, angular movement of the cellule does not effect the control wires 41 in a manner to alter the positions of the ailerons.

It may be stated here, that an elevator is not essential to my airplane in taking-off, flight or landing, in fact, during flight, it is ordinarily desirable that no elevator control be resorted to. However, to hasten the take-off by lifting the skid clear, and thereby reducing the ground friction, I prefer to provide an elevator 47, hinged in any suitable manner at 48 to the tail and controlled by crossed wires 49 which extend to lever 50. This lever is supported by a shaft 51 extending cross-wise of the fuselage and from it extends pullrod 52. Stick 46, in addition to being applied to shaft 44 in a manner to rock it, has a pivotal connection 53 whereby it may be swung fore and aft, the stick having an extension 54 which extends below pivot 53 and to which the forward end of rod 52 is applied. It will be evident that fore and aft movement of the stick operates through rod 52, lever 50 and wires 49 in a manner to swing the elevator.

In taking off, the elevator is so adjusted that the slip-stream tends to raise the tail and thereby lift the skid 13 from the ground, the ground friction thus being reduced materially so the ship may take-off with minimum run, it being remembered that elevator adjustment is not necessary to "get into the air". Once the take-off is accomplished, however, use of the elevator may be abandoned, the stick being left free so the elevator may float at will or swing freely without in any way affecting the trim or control of the ship. It is desirable, though not necessary that a yieldable support 55 (shown here as a compression spring) on the tail be applied to the underside of the elevator, the effective resistance of the support being such that it approximately balances the weight of the elevator, a feature of obvious advantage, especially when the elevator is to have the free-floating characteristics here ascribed to it.

It is to be remembered that my airplane is fully operable without the use of an elevator, and therefore only such claims as definitely specify elevator provisions are to be considered as limited thereto.

Figure 1:
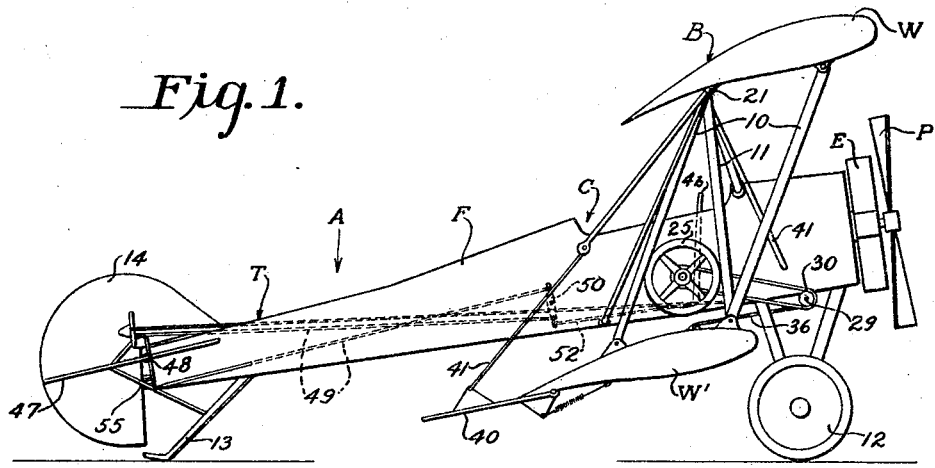
Figure 1 is a side elevation of an airplane embodying my invention.
Figure 2:
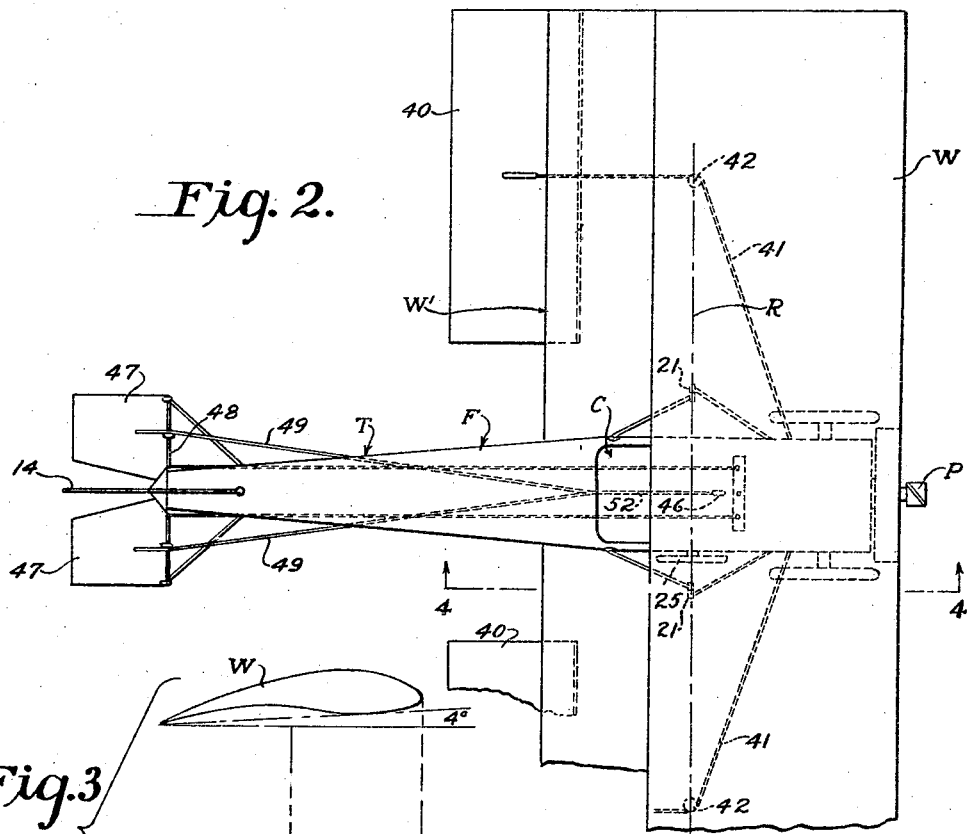
Fig. 2 is a top plan view of Fig. 1.
Figure 3:
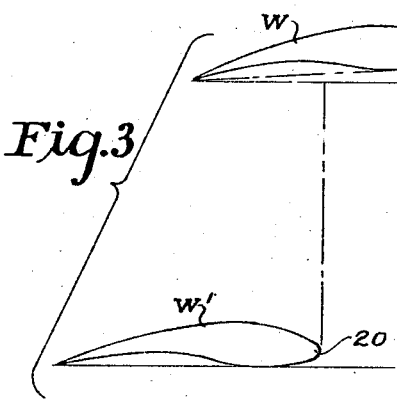
Fig. 3 is a diagrammatic view showing the "staggered-decalage" nature of one of my biplane arrangements.
Figure 8:
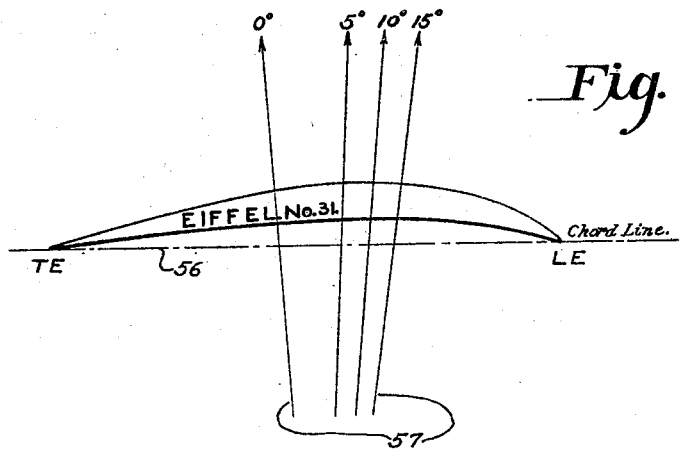
Fig. 8 is a profile of a single Eiffel No. 31 airfoil showing an analysis of the resultant force progression.

In Fig. 8 is shown a well known airfoil, namely the Eiffel No. 31 with a leading edge L. E., a trailing edge T. E., a chord line 56, and the lines of action of the resultant aerodynamic forces 57, for different angles of attack, all represented in a manner well understood by those skilled in the art. It will be noted that the lines of action 57 progress consecutively from rear to front, or from trailing edge T. E., to leading edge L. E., as the angle of attack is increased from 0° to positive 15°, in the region where the lines 57 intersect the chord line 56, and also for an appreciable distance below the chord line 56. It will be readily seen from Fig. 8 that it is necessary to descend to an unreasonably great distance below the chord line 56 before all of the lines 57 would cross each other, and thereby reverse their order of progression. Such a single airfoil is not suited to the exercise of this invention, as it is inherently unstable within any region that could be used in practise for the location of the center of gravity.

Fig. 9 is a similar diagram for a well known combination namely two R. A. F. No. 6 airfoils with 4° decalage, 50% stagger, and 1.0 $\frac{\text{gap}}{\text{chord}}$ ratio. It should be noted here, that when referring to stagger as applied to cases of combinations of dissimilar surfaces rather than the similar surfaces in the figure, displacement of the center of pressure is referred to rather than displacement of the leading edge, and I emphasize this later by designating it aerodynamic stagger; and also the term aerodynamic decalage is used to emphasize the meaning of angle between the lines of zero lift rather than between any arbitrary chord lines on the airfoils. The lines of action of the resultant aerodynamic forces, designated 57a, correspond to different angles of attack, and are shown in a similar manner to those in Fig. 8. It will be noted that in the combination of Fig. 9, these force lines progress consecutively from front to rear throughout the flying range in the zone below the arc Y—Y. This combination is suitable for the purpose of this invention, and is mounted at pivot point 21a as described under Figures 1 to 7, with the center of gravity located below the arc Y—Y.

Fig. 10 shows a monoplane wing in which the lines of action of the resultant forces 59 for increasing angles of attack on the N. A.

C. A.—M 12 surface in the zone below the line L—L progress consecutively rearward. Also, from 0° to 14° the increments of angle between any line of action and the succeeding one are roughly equal to the corresponding increments in the angle of attack. These lines of action do not converge to a common point, but intersect one another at various points in the region above L—L, becoming more heterogenous in their progression with increasing distance above L—L. If the wing be pivoted about a point J, near the wing, and at a point of mutual proximity of these lines of action 59, and the center of gravity C. G. of the whole machine placed in the zone below line L—L, it will be seen, that rotation of the wing about the point J will change the angle of attack of the wing, and at the same time, cause the corresponding line of action to pass substantially through the center of gravity. M—M represents the arc of relative movement of the center of gravity with respect to the lines of action 59.

In the diagram if the wing were brought to −1° angle of attack, the most extreme condition would prevail, and there would be a moment about point J, equal to $JK \times Z$, where JK is the length of the moment arm, and Z is the magnitude of the resultant force. If 0° were taken as the lower limit, the greatest moment would be $JD \times Z$, much smaller in amount assuming Z equal to the weight of the airplane in each case. It would not be practical in an ordinary design of airplane to ever go as low as −1° with the M—12 surface, owing to the low value of lift coefficient, and it is a question, if it would be advantageous to ever go as low as 0°. Similarly, it would not be desired to exceed 14° in the high angle condition. Thus, it will be seen, that, while this wing does not give an ideal diagram, it gives a very close approximation to it, so that the structural loads which might oppose the free adjustment of the wing structure due to eccentricity of certain of the resultant forces about the pivot point J, are negligibly small, if the angle range be limited to that which aerodynamic reasons alone would dictate for the most efficient design of complete airplane, and which would be considered as the flying range. A wing showing such a diagram as that of Fig. 10 is well suited to this invention. The vertical location of the center of gravity C. G., and the corresponding line M—M could be placed anywhere desired, provided it is below the line L—L. The line L—L is somewhat less than a half chord length below the pivot point J, which permits of a location of the center of gravity well within the limit of practical design. In fact, for many useful designs, a location as low as is shown on the line M—M of Fig. 10, which is less than a chord length below the pivot point J, would be desired.

Assume that the airplane is flying at 0° angle of attack, and that therefore the force line designated 0° passes through the center of gravity. Now assume that some external force tends to nose the machine over to −1.5°. The force line indicated as −1.5° comes into play, exerting a moment $NH \times Z'$, where Z' is the resultant force at −1.5° and constant speed, tending to return the airplane to its 0° angle condition. In Fig. 10, if the wing were adjusted to bring the line of action 59, for 14° angle of attack on the center of gravity, in level flight, the location of the center of gravity, with respect to the wing would be at S. Now, if an external influence should upset the airplane to bring the angle of attack to 20°, a moment equal to $SV \times Z$, where Z' is the value of the resultant force for 20° angle of attack, would come into action tending to restore the airplane to 14° angle of attack. It will thus be clear without further explanation that the whole machine will tend to return to any angle for which the wing has been adjusted, if displaced by an external disturbing influence, and that the magnitude of the moment tending to return the airplane to its normal attitude is greater, the further it is displaced therefrom, thus evidencing a condition of complete inherent stability throughout the flying range.

Referring again to Fig. 10 an operating means which would render this wing suitable for an airplane embodying this invention might be built, for example, as follows: The pivot J is built in duplicate, the two sections being spaced transversely apart, and secured to any suitable portion of a fuselage structure. At a point to the rear of J, lugs 60, also spaced transversely are provided, pivoted to connecting rods 61, in turn pivoted to cranks 62, transversely spaced on shaft 63, and rotated by worm 65, secured to spindle 66, mounted in bearing 67, and operated by hand wheel 68. Bearing 67, and shaft 63 are mounted in a suitable manner at a suitable location on the fuselage structure. Thus the operator may adjust the angular relation between the wing and the fuselage by turning hand wheel 68.

In Fig. 11 there is shown a supporting surface 69 of well known type, such as the National Advisory Committee for Aeronautics, Surface M5, in which the lines of action of the resultant aerodynamic forces progress in order but do not all converge to a common point. Some of these lines, however, such as those lying between 6° and 16°, do converge at a substantially common point as indicated at Q, while the lines beyond these limits are external to the common point.

In Fig. 12 which shows one manner in which the supporting surface of Fig. 11 may be applied to an airplane in accordance with the invention, 70 indicates the fuselage, 71 the propeller, 72 the rudder, 73 the elevator, and 74 a landing wheel, all of these parts being of any suitable construction.

The fuselage is provided with slots 75 and 76 through which the tubular spars 77 and 78 of the supporting surface 69 pass. Each of these slots has a contour bearing a definite relation to the uneven but consecutively increasing order of the angle and displacement of the lines of action of the resultant forces as the angle of attack of the surface 69 is varied. In other words, if the surface is moved forward on the fuselage in the slots its angle of attack will be changed and it will simultaneously be translated to a new position such that the resultant force acting on the surface will pass through the same position with respect to the center of gravity C. G. in all positions of the surface relative to the fuselage, this line being designated C. G. in Figs. 12 and 13.

Thus the airplane will be in stable equilibrium with any angular setting of the supporting surface 69, for, any tendency of an external influence to upset the longitudinal axis of the system will result in altering the angle of attack which shifts the location of the resultant force in a direction which induces a moment tending to return the airplane to its former attitude.

Any suitable means may be employed for moving the surface 69 relatively to the fuselage in the slots 75 and 76. I show a mechanism consisting of a crank 79, provided with a slot 80 engaging the rear spar 78. Such a crank is mounted on each end of a shaft 81 to rotate in unison therewith, thereby adjusting the rear wing spar 78 to any desired location in the slot 76, and also, by the presence of the two cranks, 79, securing the wing spar 78 against sidewise twisting in the slot 76. The shaft 81 is fitted with a worm wheel 83, operated by a worm 82, turned by a shaft 84 and a hand wheel 85. A framing of the wing 69, not shown, rigidly secures the spar 77 to the spar 78 so that any movement of the spar 78 produces a corresponding movement of the spar 77 and of the whole wing 69. Four adjusted positions of the system are indicated in Fig. 13 by the chord lines, and lines representing the location and direction of the resultant aerodynamic forces corresponding thereto, of 2° angle of attack, 6° angle of attack, 16° angle of attack and 20° angle of attack, shown respectively in full lines, dot and dash lines, dash lines and dash and double dot lines.

Referring to Fig. 11, it will be noted that the lines of action of the resultant forces corresponding to the range of angles of attack from 6° to 16° converge to substantially a point Q. A trunnion mounting could be provided to rotatably support the wing structure 69 from this point Q, and thereby secure the advantages of this invention, if it were desired to fly only thru the range of 6° to 16°. The means shown in Figs. 12 and 13 and described above will permit of the exercise of this invention throughout the extended range of 2° to 20°. By a suitable design of slots 75 and 76, and a suitable cooperating mechanism this invention may be utilized throughout any other range through which the progression of resultant forces is consecutively rearward for increasing angles of attack as described herein.

In Fig. 11, there is a region above point Q in which the progression of the lines of action of the resultant forces is not consecutively rearward, and a zone below point Q where it is consecutively rearward for increasing angles of attack. Under these circumstances, the center of gravity of the airplane should be located below the point Q.

In Fig. 13, a means is shown for a proper exercise of this invention, as the center of gravity lies in the zone in which the progression is consecutively rearward for increase in angle of attack. The design of the means is such that when the wing structure is adjusted for any new angle of attack, the line of action of the corresponding resultant aerodynamic force is brought to pass through the center of gravity, C. G., of the airplane.

While certain preferred embodiments of the invention have been disclosed it will be understood that it may be embodied in other forms and that various changes in structural details may be made without departing from the principle of the invention as defined in the appended claims.

I claim:—

1. In an airplane, the combination of a fuselage, a unitary wing structure of the class wherein there is a zone in which the lines of action of the resultant aerodynamic forces progress consecutively from front to rear and converge approximately to a point and means for rotatably and adjustably moving the wing structure upon the fuselage substantially about said point of convergence; the center of gravity of the airplane being located below said point of convergence and within the zone, whereby rotation of the wing structure will change the angle of attack and bring the corresponding line of action through the center of gravity to maintain the flying attitude of the fuselage substantially constant with respect to the path of the airplane.

2. In an airplane, the combination of a fuselage, a unitary wing structure of the class wherein there is a zone in which the lines of action of the resultant aerodynamic forces progress consecutively from front to rear in increments substantially equal to the corresponding increments in the angle of attack through the normal flying range and means for rotatably and adjustably moving the structure on the fuselage about a point of mutual proximity of the lines of action, the center of gravity of the airplane lying below the point of convergence and within the zone, whereby rotation of the wing structure will change the angle of attack and bring the corresponding line of action through the center of gravity to maintain the flying attitude of the fuselage substantially constant with respect to the path of the airplane.

3. In an airplane, the combination of a fuselage, a monoplane wing of the class wherein there is a zone in which the lines of action of the resultant aerodynamic forces progress consecutively from front to rear and converge approximately to a point and means for rotatably and adjustably moving the wing upon the fuselage substantially about said point of convergence; the center of gravity of the airplane being located below said point of convergence and within the zone, whereby rotation of the wing will change the angle of attack and bring the corresponding line of action through the center of gravity to maintain the flying attitude of the fuselage substantially constant with respect to the path of the airplane.

4. In an airplane, the combination of a fuselage, a monoplane wing of the class wherein there is a zone in which the lines of action of the resultant aerodynamic forces progress consecutively from front to rear in increments substantially equal to the corresponding increments in the angle of attack through the normal flying range and means for rotatably and adjustably moving the wing on the fuselage about a point of mutual proximity of the lines of action, the center of gravity of the airplane lying below the point of convergence and within the zone, whereby rotation of the wing will change the angle of attack and bring the corresponding line of action through the center of gravity to maintain the flying attitude of the fuselage substantially constant with respect to the path of the airplane.

5. In an airplane, the combination of a fuselage, a unitary wing structure wherein the lines of action of the resultant aerodynamic forces change consecutively within a zone containing the center of gravity of the airplane as the angle of attack is changed throughout the flying range, means for movably mounting said wing structure on the fuselage on a transverse axis, and means for positively adjusting said wing structure relative to the fuselage to establish the desired angle of attack, said axis being located at such a level higher than the center of gravity of the airplane as to cause the line of action corresponding to said angle of attack to pass through said center of gravity.

6. In an airplane, the combination of a fuselage, a unitary wing structure wherein the lines of action of the resultant aerodynamic forces progress consecutively from front to rear within a zone containing the center of gravity of the airplane as the angle of attack is increased throughout the flying range and progress conversely from rear to front as the angle of attack is decreased commensurately, means for movably mounting said wing structure on the fuselage on a transverse axis, and means for positively adjusting said wing structure relative to the fuselage to establish the desired angle of attack, said axis being located at such a level higher than the center of gravity of the airplane as to cause the line of action corresponding to said angle of attack to pass through said center of gravity.

7. In an airplane, the combination of a fuselage, a unitary wing structure wherein the lines of action of the resultant aerodynamic forces change consecutively within a zone containing the center of gravity of the airplane as the angle of attack is changed throughout the flying range, means for pivotally mounting said wing structure on the fuselage on a transverse axis, and means for positively and adjustably rotating said wing structure relative to the fuselage about said transverse axis to establish any desired angle of attack, said axis being located at such a level higher than the center of gravity of the airplane as to cause the line of action corresponding to said angle of attack to pass through said center of gravity.

8. In an airplane, the combination of a fuselage, a unitary wing structure wherein the lines of action of the resultant aerodynamic forces change consecutively within a zone containing the center of gravity of the airplane as the angle of attack is changed throughout the flying range, and means for positively adjusting said wing structure relative to the fuselage about a series of transverse axes to establish any desired angle of attack, the locus of said axes being so located at such a level higher than the center of gravity of the airplane as to cause the line of action corresponding to said angle of attack to pass through said center of gravity.

9. In an airplane, the combination of a fuselage, a monoplane wing wherein the lines of action of the resultant aerodynamic forces change consecutively within a zone containing the center of gravity of the airplane as the angle of attack is changed throughout the flying range, means for movably mounting said wing on the fuselage on a transverse axis, and means for positively adjusting said wing structure relative to the fuselage to establish the desired angle of attack, said axis being located at such a level higher than the center of gravity of the airplane as to cause the line of action corresponding to said angle of attack to pass through said center of gravity.

10. In an airplane, the combination of a fuselage, a stable unitary wing structure consisting of wing surface elements having aerodynamic stagger and aerodynamic decalage, means for movably mounting said wing structure on the fuselage on a transverse axis, and means for positively adjusting said wing structure relative to the fuselage to establish any desired angle of attack, said axis being located at such a level higher than the center of gravity of the airplane as to cause the line of action corresponding to said angle of attack to pass through said center of gravity.

11. In an airplane, the combination of a multiplane wing cellule of the class wherein the lines of action of the resultant aerodynamic forces change consecutively within a zone containing the center of gravity of the airplane as the angle of attack is changed throughout the normal flying range, means for movably mounting said cellule on the fuselage on a transverse axis, and means for positively adjusting said cellule relative to the fuselage to establish the desired angle of attack, said axis being located at such a level higher than the center of gravity of the airplane as to cause the line of action corresponding to said angle of attack to pass through said center of gravity.

12. In an airplane, the combination of a fuselage, a unitary wing structure wherein the lines of action of the resultant aerodynamic forces change consecutively within a zone containing the center of gravity of the airplane as the angle of attack is changed throughout flying range, the location of said lines of action being fixed with respect to said wing structure and means for mounting said wing structure on the fuselage comprising a transverse pivotal connection between said fuselage and said structure and an additional positive adjustable connection between said fuselage and said structure, whereby adjustment of said connection will change the angle of attack and bring the corresponding line of action through the center of gravity of the airplane to maintain the normal flying attitude.

13. In an airplane, the combination of a fuselage, a unitary wing structure wherein the lines of action of the resultant aerodynamic forces progress consecutively from front to rear within a zone containing the center of gravity of the airplane as the angle of attack is increased thruout the flying range, a transverse pivotal connection between the fuselage and the wing structure and means for sustaining torque about the connection for establishing any desired angle of attack, said connection being located at such a level higher than the center of gravity of the airplane as to cause the line of action corresponding to said angle of attack to pass thru the center of gravity.

14. In an airplane, a fuselage, an aerodynamic surface movably mounted on the fuselage, a mechanism settable at will by the operator to adjust the aerodynamic surface to establish the angle of attack of the airplane, said angle of attack having a determinable critical value above which the airplane stalls, and said mechanism having a position corresponding to said critical value, and means to prevent the movement of said mechanism beyond said position.

15. In an airplane, a fuselage, an aerodynamic surface movably mounted on the fuselage, a mechanism settable at will by the operator to adjust the aerodynamic surface to establish the angle of attack of the airplane, said angle of attack having a determinable critical value below which loss of lift occurs, and said mechanism having a position corresponding to said critical value, and means to prevent the movement of said mechanism beyond said position.

16. In an airplane, a fuselage, an aerodynamic surface movably mounted on the fuselage, a mechanism settable at will by the operator to adjust the aerodynamic surface to establish the angle of attack of the airplane, said mechanism having a predetermined critical position of adjustment above which the airplane stalls, and means to stop the movement of the mechanism when it increases to said critical position.

17. In an airplane, a fuselage, an aerodynamic surface movably mounted on the fuselage, a mechanism settable at will by the operator to adjust the aerodynamic surface to establish the angle of attack of the airplane, said mechanism having a predetermined critical position of adjustment below which the airplane loses its lift, and means to stop the movement of the mechanism when it decreases to the critical position.

18. In an airplane, a fuselage, an aerodynamic surface movably mounted on the fuselage, a mechanism settable at will by the operator to adjust the aerodynamic surface to establish the angle of attack of the airplane, said angle of attack having a determinable low value below which loss of lift occurs and a determinable high value above which the airplane stalls, and said mechanism having a minimum position corresponding to said low value and a maximum position corresponding to said high value, and positive means to prevent said mechanism from moving below said minimum position or above said maximum position.

In testimony whereof I affix my signature.

ALBERT A. MERRILL.